(12) United States Patent
Herman (10) Patent No.: US 9,244,459 B2
(45) Date of Patent: Jan. 26, 2016

(54) REFLEXIVE RESPONSE SYSTEM FOR POPUP THREAT SURVIVAL

(71) Applicant: Lockheed Martin Corporation, Bethesda, MD (US)

(72) Inventor: Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 63 days.

(21) Appl. No.: 14/135,258

(22) Filed: Dec. 19, 2013

(65) Prior Publication Data

US 2014/0309808 A1  Oct. 16, 2014

Related U.S. Application Data

(63) Continuation of application No. 13/414,347, filed on Mar. 7, 2012, now Pat. No. 8,791,836.

(51) Int. Cl.
    *G05D 1/00*     (2006.01)
    *G08G 1/00*     (2006.01)
    *F41G 9/00*     (2006.01)

(52) U.S. Cl.
    CPC ............... *G05D 1/0055* (2013.01); *G05D 1/00* (2013.01); *G05D 1/0011* (2013.01); *G05D 1/0088* (2013.01); *G08G 1/00* (2013.01); *F41G 9/00* (2013.01)

(58) Field of Classification Search
    CPC ...... G05D 1/0055; G05D 1/0011; G05D 1/00
    USPC ......... 340/901, 945, 961, 963; 701/301, 23, 1
    See application file for complete search history.

(56) References Cited

U.S. PATENT DOCUMENTS

| | | | |
|---|---|---|---|
| 4,449,041 | A | 5/1984 | Girard |
| 4,760,396 | A | 7/1988 | Barney et al. |
| 4,812,990 | A | 3/1989 | Adams et al. |
| 4,947,350 | A | 8/1990 | Murray et al. |
| 5,086,396 | A | 2/1992 | Waruszewski, Jr. |

(Continued)

FOREIGN PATENT DOCUMENTS

| | | |
|---|---|---|
| CA | 2580978 A1 | 3/2006 |
| CN | 201918032 U | 8/2011 |

(Continued)

OTHER PUBLICATIONS

International Search Report and Written Opinion for PCT/US2013/039412 mailed Jan. 31, 2014.

(Continued)

*Primary Examiner* — Steven Lim
*Assistant Examiner* — Hongmin Fan
(74) *Attorney, Agent, or Firm* — Wolf, Greenfield & Sacks, P.C.

(57) ABSTRACT

Methods and apparatus for assessing threats to a vehicle to facilitate a reflexive response. Threat timeline parameters for a detected threat to the vehicle including a threat mode and a time progression of the threat in the threat mode is determined based, at least in part, on a plurality of information sources. One or more candidate solutions for facilitating the reflexive response to the threat are determined based, at least in part, on the threat mode and the time progression and one or more of the candidate solutions are presented to an operator of the vehicle to enable the operator to mediate the threat.

20 Claims, 8 Drawing Sheets

(56) References Cited

U.S. PATENT DOCUMENTS

| | | |
|---|---|---|
| 5,111,400 A | 5/1992 | Yoder |
| 5,122,801 A | 6/1992 | Hughes |
| 5,287,110 A | 2/1994 | Tran |
| 5,406,286 A | 4/1995 | Tran et al. |
| 5,410,313 A | 4/1995 | Tran |
| 5,428,530 A | 6/1995 | Brown et al. |
| 5,442,556 A | 8/1995 | Boyes et al. |
| 5,457,460 A | 10/1995 | Tran et al. |
| 5,461,571 A | 10/1995 | Tran |
| 5,549,477 A | 8/1996 | Tran et al. |
| 5,574,458 A | 11/1996 | Tran |
| 5,606,500 A | 2/1997 | Tran |
| 5,631,640 A * | 5/1997 | Deis et al. .................... 340/961 |
| 5,787,333 A | 7/1998 | Rasinski et al. |
| 5,838,262 A | 11/1998 | Kershner et al. |
| 6,002,347 A | 12/1999 | Daly et al. |
| 6,127,944 A | 10/2000 | Daly et al. |
| 6,267,039 B1 | 7/2001 | Czarnecki |
| 6,282,526 B1 | 8/2001 | Ganesh |
| 6,538,581 B2 | 3/2003 | Cowie |
| 6,734,824 B2 | 5/2004 | Herman |
| 6,778,906 B1 | 8/2004 | Hennings et al. |
| 6,980,151 B1 | 12/2005 | Mohan |
| RE39,053 E | 4/2006 | Rees |
| 7,120,445 B2 | 10/2006 | DeMarco et al. |
| 7,161,500 B2 | 1/2007 | Alfredsson et al. |
| 7,194,353 B1 | 3/2007 | Baldwin et al. |
| 7,206,444 B2 | 4/2007 | Herman |
| 7,422,175 B1 | 9/2008 | Bobinchak et al. |
| 7,769,502 B2 | 8/2010 | Herman |
| 7,848,879 B2 | 12/2010 | Herman |
| 7,979,199 B2 | 7/2011 | Judd et al. |
| 8,005,657 B2 | 8/2011 | Herman et al. |
| 8,009,515 B2 | 8/2011 | Cecala et al. |
| 8,025,230 B2 | 9/2011 | Moraites |
| 8,185,256 B2 | 5/2012 | Herman |
| 8,791,836 B2 | 7/2014 | Herman |
| 8,831,793 B2 | 9/2014 | Herman |
| 2002/0150866 A1 | 10/2002 | Perry et al. |
| 2003/0060942 A1 | 3/2003 | Kotzev et al. |
| 2003/0154010 A1 | 8/2003 | Rao et al. |
| 2003/0215771 A1 | 11/2003 | Bartoldus et al. |
| 2004/0219491 A1 | 11/2004 | Shlomo |
| 2005/0038628 A1 | 2/2005 | Beuttel et al. |
| 2005/0073439 A1 | 4/2005 | Perricone |
| 2005/0256682 A1 | 11/2005 | Galutia et al. |
| 2005/0275582 A1 | 12/2005 | Mohan |
| 2006/0142903 A1 | 6/2006 | Padan |
| 2006/0184292 A1 | 8/2006 | Appleby et al. |
| 2006/0266203 A1 | 11/2006 | Herman et al. |
| 2006/0267827 A1 | 11/2006 | Ferm et al. |
| 2006/0271245 A1 | 11/2006 | Herman |
| 2007/0023582 A1 | 2/2007 | Steele et al. |
| 2007/0210953 A1 | 9/2007 | Abraham et al. |
| 2007/0244673 A1 | 10/2007 | Khosla et al. |
| 2007/0288208 A1 | 12/2007 | Grigsby et al. |
| 2008/0052054 A1 | 2/2008 | Beverina et al. |
| 2008/0077474 A1 | 3/2008 | Dumas et al. |
| 2008/0111728 A1 | 5/2008 | Stevens |
| 2008/0133070 A1 | 6/2008 | Herman |
| 2008/0136701 A1 | 6/2008 | Ferm et al. |
| 2008/0158256 A1 | 7/2008 | Russell et al. |
| 2008/0258063 A1 | 10/2008 | Rapanotti |
| 2008/0291075 A1 | 11/2008 | Rapanotti |
| 2008/0297395 A1 | 12/2008 | Dark et al. |
| 2009/0173788 A1 | 7/2009 | Moraites et al. |
| 2009/0271157 A1 | 10/2009 | Herman et al. |
| 2009/0322584 A1 * | 12/2009 | Herman ......................... 342/13 |
| 2010/0010793 A1 * | 1/2010 | Herman ......................... 703/8 |
| 2010/0017114 A1 | 1/2010 | Tehan et al. |
| 2010/0135120 A1 | 6/2010 | Cecala et al. |
| 2010/0145552 A1 | 6/2010 | Herman et al. |
| 2010/0208075 A1 | 8/2010 | Katsuno |
| 2010/0231418 A1 | 9/2010 | Whitlow et al. |
| 2010/0253567 A1 | 10/2010 | Factor et al. |
| 2011/0001062 A1 | 1/2011 | Herman et al. |
| 2011/0029234 A1 | 2/2011 | Desai et al. |
| 2011/0196551 A1 | 8/2011 | Lees et al. |
| 2012/0078498 A1 | 3/2012 | Iwasaki et al. |
| 2012/0276517 A1 | 11/2012 | Banaszuk et al. |
| 2013/0124089 A1 | 5/2013 | Herman et al. |
| 2013/0234864 A1 | 9/2013 | Herman |
| 2013/0245931 A1 | 9/2013 | Rosswog et al. |
| 2013/0259300 A1 | 10/2013 | Rosswog et al. |
| 2013/0293406 A1 | 11/2013 | Herman |
| 2013/0297096 A1 | 11/2013 | Herman |
| 2013/0297271 A1 | 11/2013 | Herman |

FOREIGN PATENT DOCUMENTS

| | | |
|---|---|---|
| WO | WO 2006/033112 A3 | 3/2006 |
| WO | WO 2013/122521 A1 | 8/2013 |

OTHER PUBLICATIONS

International Preliminary Report on Patentability for PCT/US2013/039412 mailed Nov. 13, 2014.

* cited by examiner

REFLEXIVE RESPONSE SYSTEM FOR POPUP THREAT SURVIVAL

RELATED APPLICATION

This application is a continuation of U.S. patent application Ser. No. 13/414,347, filed Mar. 7, 2012, and titled "REFLEXIVE RESPONSE SYSTEM FOR POPUP THREAT SURVIVAL," the entire contents of which are incorporated herein by reference.

BACKGROUND

Vehicles involved in military missions often encounter unanticipated threats (also called "popup" threats) which threaten the survivability of the vehicle. For example, an aircraft flying through enemy territory may encounter threats on the ground such as people or vehicles with anti-aircraft weapons capable of shooting down the aircraft or disrupting its flight path. In response to detecting a popup threat, a typical response by an operator of the vehicle may be to increase the distance between the vehicle and the threat in an effort to lessen the ability of the threat to engage the vehicle in an action that would result in destruction of the vehicle or disruption of the mission. Alternatively, depending on the mission parameters, the operator of the vehicle may risk being targeted by a popup threat to ensure that the mission is completed successfully.

SUMMARY

Some embodiments of the present invention are directed to a method of assessing threats to a vehicle to facilitate a reflexive response. The method comprises determining based, at least in part, on a plurality of information sources, a plurality of threat timeline parameters for a detected threat to the vehicle, wherein the plurality of threat timeline parameters includes a first threat mode and a time progression of the threat in the first threat mode; determining, with at least one processor, one or more candidate solutions based, at least in part, on the first threat mode and the time progression; and providing at least one of the one or more candidate solutions to an operator of the vehicle to enable the operator to mediate the threat.

Some embodiments are directed to a computer-readable storage medium encoded with a plurality of instructions that when executed by at least one processor perform a method. The method comprises determining based, at least in part, on a plurality of information sources, a plurality of threat timeline parameters for a detected threat to the vehicle, wherein the plurality of threat timeline parameters includes a first threat mode and a time progression of the threat in the first threat mode; determining one or more candidate solutions based, at least in part, on the first threat mode and the time progression; and providing at least one of the one or more candidate solutions to an operator of the vehicle to enable the operator to mediate the threat.

Some embodiments are directed to a vehicle comprising: at least one storage device configured to store information regarding at least one signature of the vehicle; and at least one processor programmed to: determine based, at least in part, on the stored information, a plurality of threat timeline parameters for a detected threat to the vehicle, wherein the plurality of threat timeline parameters includes a first threat mode and a time progression of the threat in the first threat mode; determine one or more candidate solutions based, at least in part, on the first threat mode and the time progression; and provide at least one of the one or more candidate solutions to an operator of the vehicle to enable the operator to mediate the threat.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present disclosure generally relates to inventive methods and apparatus for assessing popup threats to a vehicle to facilitate a reflexive response by an operator of the vehicle. In particular, some embodiments of the invention relate to providing the operator of a vehicle with one or more recommended solutions to mitigate a detected popup threat. The one or more recommended solutions are determined based, at least in part, on an assessment of the threat's progression along a continuum of states or "modes" reflecting the threat status of the particular threat.

The inventor has recognized and appreciated that conventional methods for assessing a threat status of popup threat often do not take into account threat timeline information when determining responsive courses of action. Accordingly, some embodiments of the invention relate to methods and apparatus for providing one or more recommended courses of action in response to a popup threat by determining and analyzing candidate solutions using stored information about a vehicle and one or more estimated threat timeline parameters. Although the exemplary threats described herein relate primarily to popup threats encountered during a military mission, it should be appreciated that embodiments of the invention are not limited to use in these type of scenarios. For example, some embodiments may be employed in a civilian vehicle traveling down a road, which may encounter unexpected threats such as other cars, pedestrians, etc., which may pose a threat to the occupants of the vehicle and/or endanger aspects of the threat itself. In such embodiments, the operator of the vehicle may be provided with information to prevent engagement with the detected threat.

Figure 1:
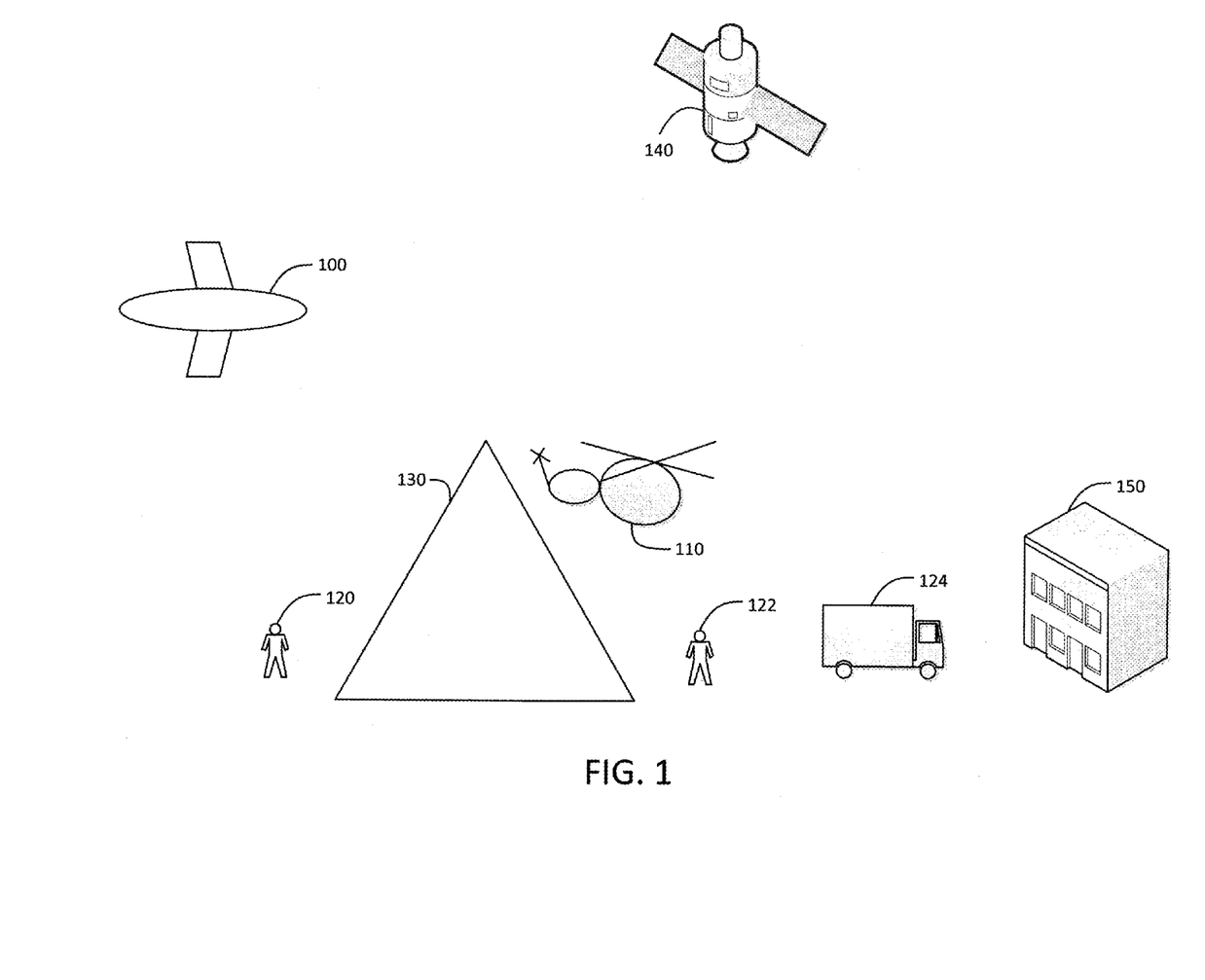
FIG. 1 is an illustration of an exemplary scenario in which some embodiments of the invention may be implemented.

FIG. 1 illustrates an exemplary scenario in which some embodiments of the invention may be employed. Although some of the examples described herein relate primarily to aircraft vehicles, including winged aircraft such as planes and rotocraft such as helicopters, it should be appreciated that embodiments of the invention may be used in any suitable type of vehicle where a determination of a survivable course of action for the vehicle is useful including, but not limited to, land vehicles, water and underwater vehicles, space-based vehicles, and vehicles that are manned or unmanned.

In the exemplary scenario in FIG. 1, two vehicles, plane 100 and helicopter 110 are involved in a military mission to destroy target 150 located in enemy territory. During the mission, plane 100 and helicopter 110 may encounter one or more unanticipated enemy threats intent on destroying the vehicles before they can accomplish their mission. For example, threat 120 may be an enemy soldier equipped with a shoulder-mounted missile launcher with infrared tracking capabilities and threat 122 may be an enemy soldier with a rocket-propelled grenade launcher capable of targeting low-flying aircraft. Other potential threats include, but are not limited to, enemy vehicles such as threat 124 capable of firing one or more anti-aircraft weapons. To successfully accomplish the mission, plane 100 and helicopter 110 may desire to remain undetected by potential threats for as long as possible. However, sometimes detection may be inevitable and in these situations the operators of plane 100 and helicopter 110 may attempt to follow a survivable course of action that reduces the interaction between potential threats and their vehicles.

Some embodiments of the invention are directed at evaluating a plurality of information sources to facilitate a determination of survivable courses of action presented to an operator of the vehicle. Some of the information sources may be stored on board the vehicle in one or more storage devices associated with one or more processors, whereas other information sources may be externally located from the vehicle. For example, information may be received by plane 100 via a communication link to an external source such as satellite 140 and/or helicopter 110. Additionally, environment information including information about a popup threat may be received by one or more sensors incorporated into the vehicle including, but not limited to, a radar device and an infrared detection device. In some embodiments, information received from external sources may be considered with information stored on-board the vehicle to determine one or more threat timeline parameters for a popup threat, as discussed in more detail below.

Figure 2:
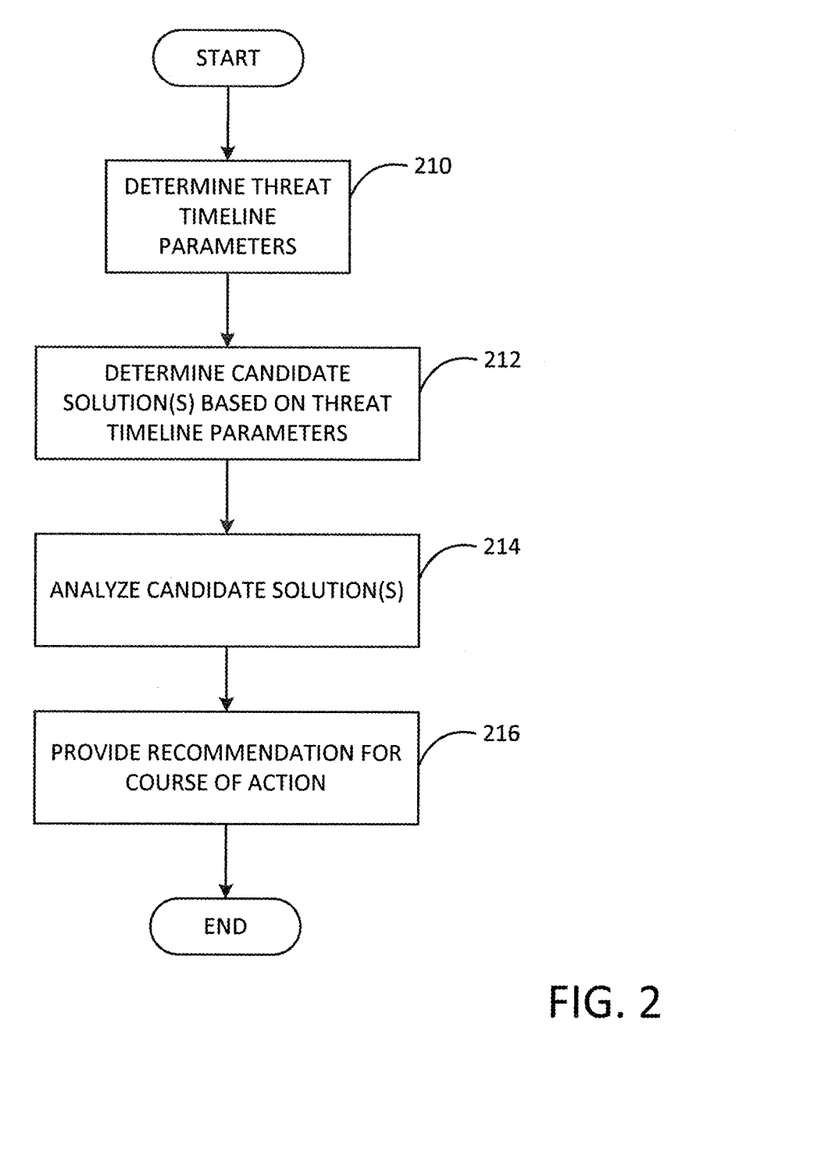
FIG. 2 is a flow chart of a process for providing a recommended survival course of action to an operator of a vehicle in accordance with some embodiments of the invention.

FIG. 2 illustrates an exemplary process for determining a recommended course of action in accordance with some embodiments of the invention. In act 210, one or more threat timeline parameters are determined based, at least in part, on information retrieved from a plurality of information sources. A further description of how threat timeline parameters are determined in accordance with some embodiments is described in more detail below in connection with FIG. 3. After threat timeline parameters have been determined, the process proceeds to act 212 where one or more candidate solutions are determined based, at least in part, on the threat timeline parameters. For example, as discussed below in more detail, the threat timeline parameters may be used to constrain a search for candidate solutions by limiting the search space for evaluating candidate solutions to include only solutions that may be accomplished within a specific amount of time. Searching for candidate solutions may also be constrained in other ways including, but not limited to, constraining based on the capabilities of the vehicle, information regarding other friendly vehicles participating in the mission, and factors related to the mission itself, such as the importance of completing the mission.

After the one or more candidate solutions are determined, the process proceeds to act 214 where the candidate solution(s) are analyzed to determine a recommended survival course of action. In some embodiments, the candidate solution(s) may be processed by mission management software executing on one or more processors in the vehicle to evaluate the candidate solution(s) in the context of the mission objective(s). For example, if the primary mission objective is for an aircraft to destroy a building that by its elimination would save the lives of a considerable number of ground forces, the mission management software may determine that the importance of the mission is high enough that the aircraft is willing to risk being detected by popup threats to accomplish the mission objective. However, in another example, if the mission objective is to drop relief aid to humanitarian workers on the ground, the mission management software may determine that risking being shot down by a popup threat that is ready to engage the aircraft is not warranted provided that the delivery of the relief aid is not imminently needed.

After the candidate solution(s) have been analyzed, the process proceeds to act 216 where a recommendation for a survivable course of action is provided to an operator of the vehicle. In some embodiments, the recommendation may include one or more optional courses of action from which the operator can select, whereas in other embodiments, the recommendation may only include a single course of action which the operator is instructed to follow. The recommendation may be provided to the operator in any suitable way including, but not limited to, displaying the recommendation on a display and audibly presenting the recommendation to the operator. In some embodiments, the recommended course of action may be automatically executed by one or more processors controlling the vehicle without intervention from a human operator. For example, one or more processors executing mission management software on an unmanned aircraft may be programmed to automatically perform the recommended course of action in response to being provided with the recommendation.

The process described in FIG. 2 may be initiated in any suitable manner including, but not limited to, in response to an actuation of a control by an operator and in response to an occurrence of an event (e.g., detection of a popup threat). Additionally, the process may be repeated at periodic or aperiodic intervals and embodiments of the invention are not limited in the frequency with which the process is executed.

The frequency with which the process is executed may depend, at least in part, on the particular vehicle with which embodiments of the invention are associated with. For example, a pilot of an aircraft may not want to be provided with continuous updates on recommended courses of action throughout a mission. Accordingly, some embodiments may execute the process of FIG. 2 at periodic intervals specified by the operator or in response to the operator requesting that the process be executed. Alternatively, the process of FIG. 2 may be continuously executed to provide frequent updated recommendations, but the recommendations may only be provided to the operator at periodic intervals to prevent the operator of the vehicle from receiving updated recommendations at undesired times.

In another scenario, some embodiments of the invention may be implemented on an unmanned vehicle that does not consider continuously updated recommendations to be cumbersome to the operation of the vehicle. In such instances, the process of FIG. 2 may be executed continuously to provide the vehicle with current recommendations on courses of action.

Figure 3:
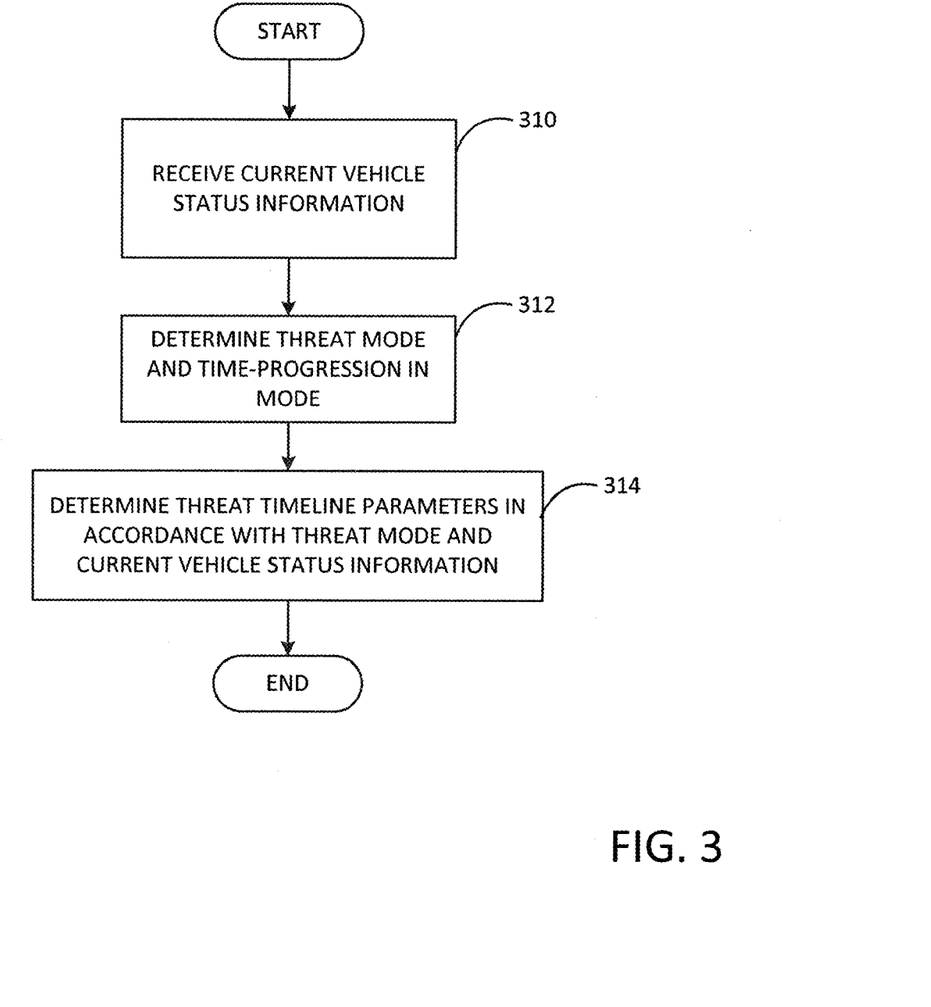
FIG. 3 is a flow chart of a process for determining threat timeline parameters for a threat in accordance with some embodiments of the invention.

As discussed above, some embodiments determine threat timeline parameters for a popup threat based, at least in part, on analyzing information from a plurality of information sources. FIG. 3 illustrates an exemplary method for determining threat timeline parameters in accordance with some embodiments of the invention. In act 310, information about the current status of the vehicle is received. In some embodiments, at least some of the status information may be received from one or more sensors associated with the vehicle. For example, information about the vehicle's location including, but not limited to, elevation, azimuth, and global positioning satellite (GPS) coordinates may be received and information about the speed and direction of the vehicle may be determined based on input provided by one or more sensors associated with the vehicle.

Other information such as current environmental conditions may also be determined based on input from one or more sensors or from any suitable source including information stored in an environment database. For example, an image sensor located on the vehicle may capture an image of the current environment and the image may be analyzed to determine a type of environment (e.g., forest, desert, urban, etc.). In some embodiments environment information may be determined based on current location coordinates of the vehicle rather than being based on sensor information and embodiments of the invention are not limited in the particular manner in which environment information is determined.

In some embodiments, information related to a current geometry between the vehicle and a popup threat may be determined. The current geometry information may include, but is not limited to, the distance between the vehicle and the threat and whether any obstructions are between the vehicle and the threat. For example, referring to the exemplary scenario illustrated in FIG. 1, the distance between plane 100 and threat 120 is less than the distance between plane 100 and threat 122. Additionally, mountain 130 is an obstruction between plane 100 and threat 122, whereas there is no such obstruction between plane 100 and threat 120. Such information may be used in conjunction with current vehicle status information and/or environmental information to determine threat timeline parameters in accordance with some embodiments of the invention.

It should be appreciated that the amount of sensor information that is received in act 310 may be different depending on the technology incorporated into a particular vehicle. In this respect, some embodiments of the invention are applicable to a vehicle having any number of sensors and any type of technology that can be used to facilitate a determination of threat timeline parameters. For example, some vehicles may be equipped with stealth technology that attempts to reduce one or more vehicle signatures to potential threats. For such vehicles, information about the current stealth status of the vehicle may be received and the stealth status may be used to determine the threat timeline parameters. Input from other technology is also contemplated and embodiments of the invention are not limited in this respect.

After receiving current status information, the process proceeds to act 312 where a threat mode and a time progression in the threat mode is determined using stored historical values for one or more of the types of status information received in 310. For example, as described above, the status information may include the current location and speed of the vehicle. In act 312, the current values for these parameters may be compared to stored historical values for these parameters to determine a path of the vehicle as a function of time. The path of the vehicle may then be used to facilitate a determination of a threat mode and a time progression in the threat mode for a particular popup threat.

Information about the vehicle may also be used in a determination of a threat mode and a time progression in the threat mode for a popup threat. In some embodiments, a vehicle may be associated with one or more "signatures" that describe a spatial profile of a particular characteristic, such as sound or thermal energy, as it relates to the vehicle. For example, each vehicle may be associated with an acoustic signature which describes the spatial acoustic profile of the vehicle when the vehicle is in operation. Aircraft, for example, may emit more sound from the back of the aircraft than the front. Anti-vehicle (e.g., anti-aircraft, anti-tank) weapons often use infrared locking mechanisms to target vehicles prior to firing on the vehicle. Accordingly, a vehicle may also be associated with an infrared signature that relates to a spatial distribution of thermal energy for the vehicle. For example, vehicle components such as engines frequently irradiate more heat than other components of the vehicle. Other signatures may also be associated with a vehicle and embodiments of the invention are not limited in this respect. For example, a vehicle may also be associated with, among other things, a radar signature, a visual signature, a weapons signature, and a jamming signature, which relates to the jamming capabilities of the vehicle.

Figure 4:
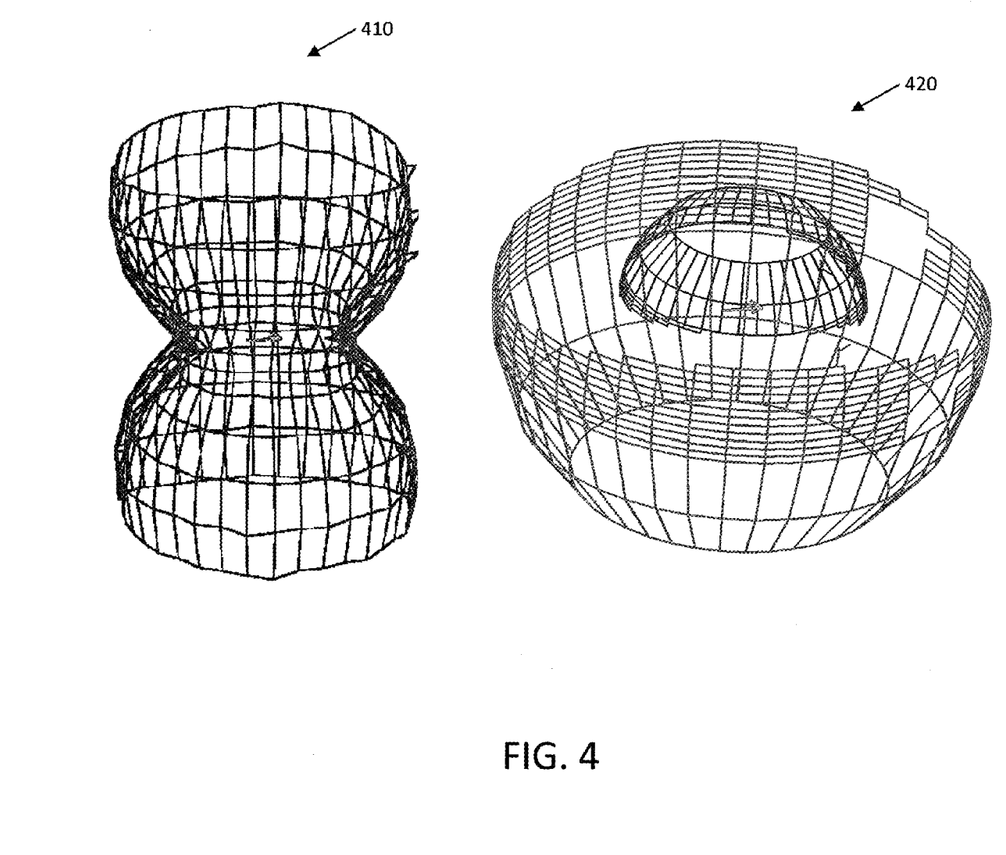
FIG. 4 is a schematic of two vehicle signatures that may be used in accordance with some embodiments of the invention.

In some embodiments, the one or more signatures associated with a vehicle may be stored on-board the vehicle in one or more storage devices connected to one or more on-board processors for implementing aspects of embodiments of the invention. The signatures may be represented in any suitable way and embodiments of the invention are not limited in this respect. FIG. 4 illustrates an exemplary representation of vehicle signatures for a helicopter using spatial plots called "cage plots," which describe the spatial distribution of particular characteristics of the vehicle. For example, visual signature 410 describes the visibility of the helicopter as a function of spatial location around the vehicle. For this particular vehicle, the visibility of the vehicle is greatest from directly above or directly below. Another example of a vehicle signature representation is weapons signature 420, which illustrates the spatial distribution of a vehicle's countermeasure abilities for engaging an enemy threat. Such information may be useful when determining a recommended survival course of action in accordance with some embodiments of the invention. In particular, one or more vehicle signatures may be used in act 312 to determine a threat mode and a time progression of a threat in the threat mode, as discussed in more detail below. Additionally, once the threat mode is determined, at least some of the one or more vehicle signatures may be used to constrain the search for candidate solution(s) as described above. For example, if the vehicle has not yet been detected by the threat, a search for candidate solution(s) may be optimized to minimize the visual signature of the vehicle and other signatures such as an infrared signature may be given less weight in the search process.

Figure 5:
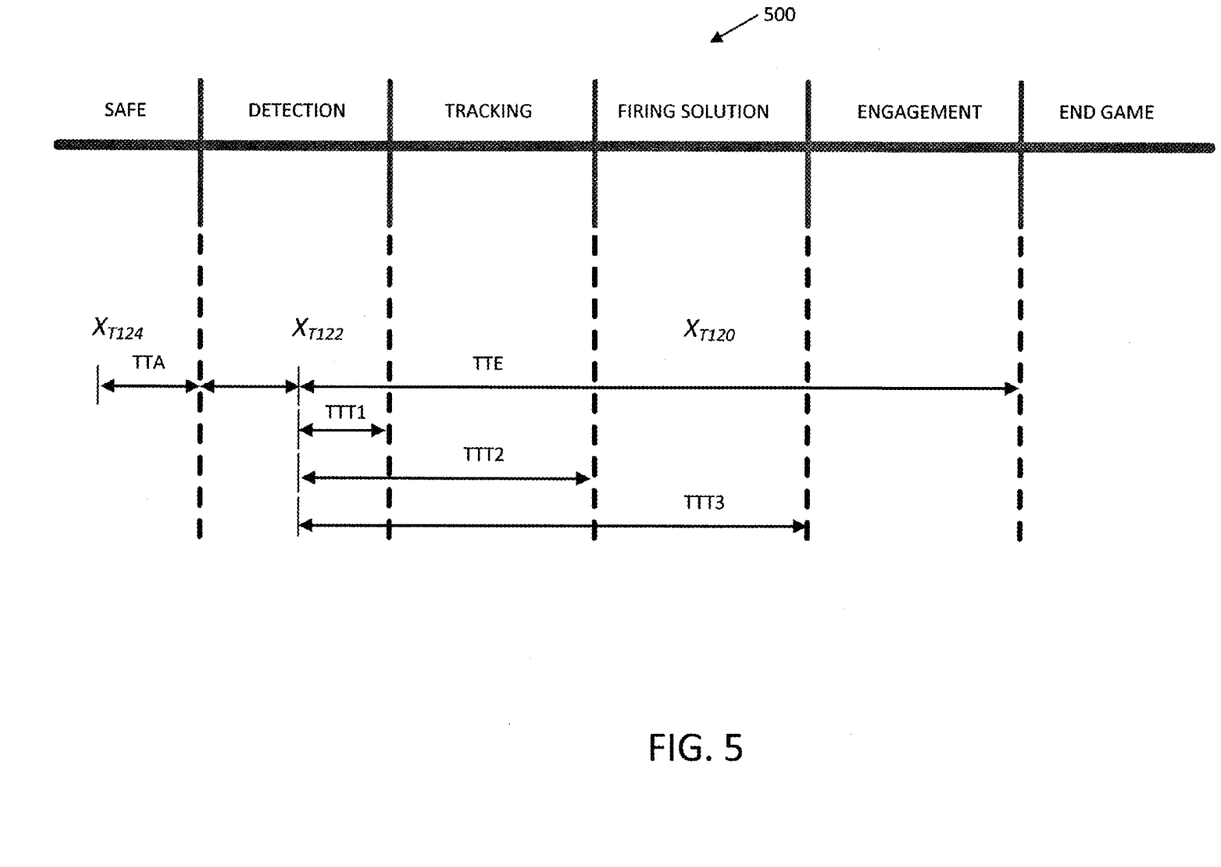
FIG. 5 is an exemplary threat timeline along which threat timeline parameters for one or more threats are determined in accordance with some embodiments of the invention.

After determining a threat mode and a time progression of a threat in the threat mode, the process of FIG. 3 proceeds to act 314, where threat timeline parameters are determined in accordance with the threat mode and the current vehicle status information. FIG. 5 is a schematic of an exemplary threat timeline 500 that includes a plurality of threat modes through which a popup threat may transition. The exemplary threat modes in threat timeline 500 include states with progressively more dangerous engagement statuses for the vehicle. Accordingly, some embodiments of the invention are directed at determining survival courses or action to break the engagement cycle of popup threats and/or devise effective countermeasure strategies if a threat's engagement progress is determined to be unavoidable (e.g., due to mission parameters or otherwise).

A brief discussion of the threat modes shown in threat timeline 500 is described below and example scenarios involving threats in the different threat modes is also discussed below using the illustration in FIG. 1 for reference. Furthermore, it should be appreciated that although threat timeline 500 includes six different threat modes, any number of threat modes may alternatively be used and embodiments of the invention are not limited in this respect.

A pre-detection threat mode ("Safe") may represent a popup threat that has been identified by the vehicle or though other intelligence being provided to the vehicle, but which has not yet detected the presence of the vehicle. The search for candidate solution(s) for threats in this threat mode may be directed primarily at continuing to evade detection. In particular, detection signatures of the vehicle such as a visual signature and an acoustic signature may be considered more prominently when evaluating candidate solutions than vehicle signatures related to weapons or jamming capabilities.

If it is determined that a threat has detected the vehicle through visual, acoustic, or some other means, but has not yet started tracking the vehicle, the threat may be determined to be in a "detection" threat mode. In this threat mode, the threat is aware of the presence of the vehicle but may not be considered very threatening to the vehicle as the threat may be out of tracking or firing range, without a clear line of sight to the vehicle, or there may be some other reason why the threat has not started tracking the vehicle. As discussed in further detail below, military vehicles are often equipped with sensors to detect electromagnetic energy that represents that the vehicle is being tracked by radar or some other type of tracking system. Accordingly the determination that a threat is in the "detection" threat mode may be based, at least in part, on the absence of such electromagnetic energy.

In some instances, it may be determined that a threat is actively tracking the vehicle, but has not yet locked onto the vehicle. In such instances, the threat may be associated with a "tracking" threat mode as illustrated in FIG. 5. Determining that the threat is tracking the vehicle may be determined in any suitable way. For example, prior to firing a weapon, threats may track a vehicle to be able to determine an accurate firing solution that is locked onto the vehicle. Typical forms of tracking include, but are not limited to, radar tracking and infrared tracking. As discussed above, for radar tracking, a tracking system on the weapon transmits an electromagnetic wave pulse and analyzes the reflected wave energy to determine the location of the target. The tracking system scans a particular area in an attempt to lock onto the coordinates of the target. Prior to locking onto the target, it is often possible for the target to detect the electromagnetic wave pulses, which indicate that the target is being tracked. After the tracking system has locked onto the target, the detected energy may switch from a pulse mode to a constant mode indicating that the weapon has locked onto the targets coordinates.

Once the targeting system has locked onto a vehicle, a targeting program associated with the weapon typically searches for a firing solution that enables the weapon to fire at the vehicle with sufficient accuracy. Because the weapon has locked onto the vehicle's position, the threat level associated with the threat is increased. In this situation, a threat may be associated with a "firing solution" mode as illustrated in FIG. 5. For example, a threat may be associated with a firing solution threat mode when the threat that has a lock on the vehicle, but has not yet fired the weapon at the vehicle. Other factors may also be considered when determining whether a threat is in a firing solution threat mode and embodiments of the invention are not limited in this respect.

A search for candidate solution(s) for threats in the tracking mode or the firing solution mode may rely less on detection signatures such as visual and acoustic signatures and may rely more on information related to the countermeasure abilities of the vehicle. For example, an aircraft may have on-board countermeasures to make it more difficult for the threat to lock onto the aircraft. Determining which of these countermeasures may be effective against a particular threat may depend on an analysis of an infrared signature of the vehicle and the vehicle-to-threat geometry. For example, the biggest heat signature from an aircraft may be the exhaust near the tail of the aircraft. By pointing the tail of the aircraft away from the threat, the tracking system of the threat's weapon may have a more difficult time locking onto the aircraft.

After a threat has fired a weapon at a vehicle, the threat may be considered to be engaged with the vehicle. Accordingly, such threats may be determined to be in an "engagement" mode and a search for candidate solution(s) may be focused on surviving incoming fire. For example, some vehicles may have some particularly vulnerable areas that are not covered with armor. To prevent the vehicle from being destroyed, recommended courses of action may include instructing the operator of the vehicle to prevent exposing such areas to the threat to reduce the survival risk of the vehicle. The search for candidate solution(s) in this mode may also include an analysis of the vehicle's weapon's signature(s) to evaluate the possibility of firing back at the threat. For example, recommended courses of action may include maneuvering the vehicle such that the vehicle's weapons can continue to fire at the threat even while increasing the distance between the vehicle and the threat.

Occasionally, a threat may cause damage to the vehicle potentially limiting the functionality of the vehicle and further increasing the survival risk of the vehicle. Threats in this state may be associated with an "end game" threat mode. A search for candidate solution(s) in the end-game mode may be similar to those in the engagement mode and the solution(s) may be further constrained based on the current capabilities of the vehicle. It should be appreciated, however, that in some embodiments only a single threat mode may be used once the threat is engaged with the vehicle and the description of two stages in FIG. 5 is merely for exemplary purposes. A description of determining threat timeline parameters for a threat based, at least in part, on a determined threat mode and a determined time progression in the threat mode is described further below, with reference to FIG. 1.

Returning to the example in FIG. 1, plane 100 may receive information (e.g., from helicopter 110 or satellite 140) about threat 124, which is a truck near the target 150, but which is out of visual and acoustic range of plane 100. Based, at least in part, on this information, it may be determined that for plane 100, threat 124 is in a pre-detection (e.g., "safe") threat mode because the threat 124 is unlikely to have detected the presence of plane 100 at this time. An identification of threat 124 being in the pre-detection mode is represented by XT124 in FIG. 5. As plane 100 approaches target 150, it may become more likely that the threat mode of threat 124 will progress through one or more of the modes of threat timeline 500, thereby putting the survivability of the vehicle more at risk.

For threats that are determined to be in a pre-detection threat mode, a first threat timeline parameter called "time-to-acquisition" (TTA) may be determined. TTA is an estimate of the amount of time before the threat is expected to detect the vehicle. The determination of TTA may be based on any of the factors discussed above including, but not limited to, historical signal paths associated with the vehicle and/or the threat, one or more vehicle signatures, environmental variables, and any other suitable factors including results of off-line simulations.

As discussed above, in some instances, it may be determined that a threat has detected a vehicle, but has not yet started to track the vehicle. For example, based on information received by plane 100, it may be determined that threat 122 has detected the presence of plane 100 due to audible cues, but is not yet tracking plane 100 in part because threat 122 has a blocked line of sight to plane 100 due to mountain 130. In this situation, it may be determined that threat 122 is associated with a "detection" threat mode as illustrated by XT122 in FIG. 5. In some embodiments, in response to determining that a threat is associated with a threat mode other than a pre-detection threat mode, one or more timeline parameters related to an estimated time to transition to more threatening modes may be determined. For example, in the exemplary threat timeline 500, threat 122 is determined to be in the "detection" threat mode. In response, threat timeline parameters estimating the time to transition (TTT) to subsequent threat modes may be determined. In timeline 500, the time to transition to each of the subsequent threat modes including the time to engagement (TTE) time to transition is illustrated, however, it should be appreciated that in some embodiments, only a subset of the illustrated TTTs may be determined and embodiments are not limited in this respect.

Each TTT for threat 122 represents an amount of time for threat 122 to transition from its current state to a particular mode at a higher threat level. A determination of one or more of the TTTs may be based on the current time progression estimate of the threat in a particular threat mode and one or more factors related to plane 100 and threat 122 including the speed, direction, and location of the vehicle and other factors including environmental conditions. In some embodiments, one or more TTTs may be determined based, at least in part, on stored off-line simulation data parameters that approximate the current vehicle-to-threat geometry and threat mode.

In addition to TTT estimates, other threat timeline parameters including, but not limited to, signal to noise ratio (SNR) threshold values and jamming to signal ratio (JSR) threshold values may be determined based, at least in part, on the current vehicle-to-threat geometry and the threat mode. In some embodiments, these additional threat timeline parameters may be determined based, at least in part, on stored off-line simulation data parameters that approximate the current vehicle-to-threat geometry and threat mode.

In some embodiments, multiple popup threats may be tracked and candidate solution(s) may be determined based on factors related to the multiple threats. For example, with respect to plane 100, threat 124 may be associated with a pre-detection threat mode, threat 122 may be associated with a detection threat mode, and threat 120 may be associated with a firing solution threat mode. Some embodiments may consider all or a subset of this information when searching for candidate solution(s) and corresponding recommended survival courses of action. For example, in some embodiments involving multiple threats, information regarding threats in more dangerous threat modes may be used to constrain the search for candidate solution(s) more than threats in less dangerous threat modes. It should be appreciated, however, that candidate solution(s) involving multiple threats may be determined in an any suitable way and aspects of the invention are not limited in this respect.

Figure 6:
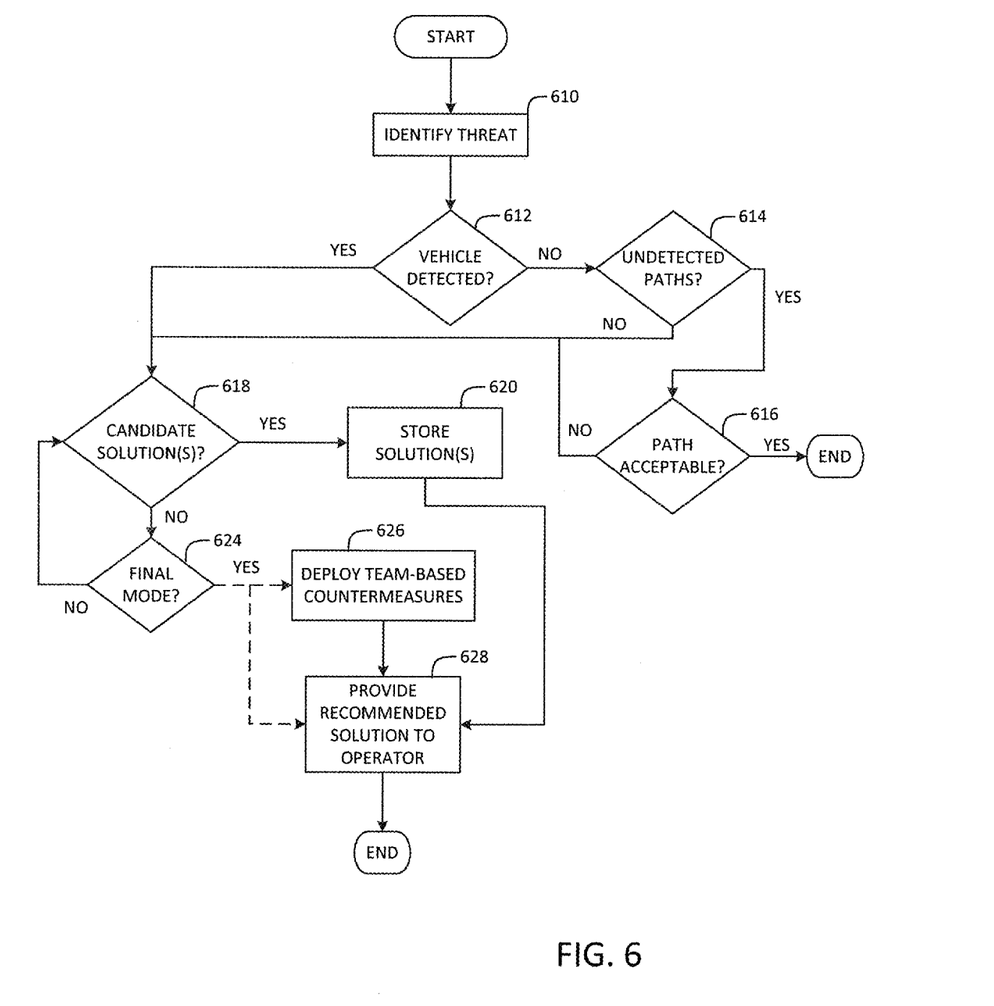
FIG. 6 is a flow chart of a process for providing a recommended course of action to an operator of a vehicle based, at least in part, on one or more threat timeline parameters determined in accordance with some embodiments of the invention.

As discussed above, after determining threat timeline parameter(s) for a threat, some embodiments of the invention are directed at using the threat timeline parameters to search for candidate solution(s) for a recommended survival course of action for a vehicle. FIG. 6 illustrates an exemplary process for providing a recommended course of action to an operator of a vehicle based, at least in part, on threat timeline parameters determined using one or more of the above-described processes.

In act 610 a threat to the vehicle is identified. As discussed above a threat may be identified in several ways and embodiments of the invention are not limited in this respect. For example, a threat may be identified through communication with another vehicle or a satellite prior to engagement with the threat or the threat may be identified when the vehicle receives incoming fire from the threat. Identification of a threat may result in the determination of threat timeline parameters for the threat as discussed above.

After the threat is identified and after threat timeline parameters have been determined, the process proceeds to act 612 where it is determined whether the threat has detected the vehicle (e.g., whether the threat mode is pre-detection). If it is determined in act 612 that the threat has not detected the vehicle, the process proceeds to act 614 where it is determined whether there are one or more paths that the vehicle can take to remain undetected. If it is determined in act 614 that there is a path that will allow the vehicle to remain undetected, the process proceeds to act 616 where it is determined whether the path to remain undetected is acceptable based, at least in part, on the vehicle's mission. As discussed above, the path that a vehicle should take may depend, at least in part, on the parameters of a particular mission associated with the vehicle. For example, an operator of a vehicle may be willing to take on the additional risk of being detected by a threat if the completion of the mission is of a high importance. In some embodiments, this risk may be assessed and managed by mission management software executing on one or more processors associated with the vehicle.

If it is determined in act 614 that there are no paths the vehicle can take without likely risking detection by the threat or if it is determined in act 616 that the path(s) determined to avoid detection are not acceptable based on the mission, the process proceeds to act 618 where it is assumed that the threat is associated with a mode where the threat has detected (or will inevitably detect) the vehicle. Additionally, if it is determined in act 612 that the vehicle has already been detected by the threat the process also proceeds to act 618 where it is determined whether one or more candidate solution(s) exist to break the threat timeline of the threat or stop progress along the threat timeline for the current threat mode associated with the target. As discussed in more detail below in connection with FIG. 7, the determination in act 618 may be based, at least in part on the threat timeline parameters determined for the threat.

If it is determined in act 618 that one or more candidate solutions exist to break the threat timeline for the current threat mode, the process proceeds to act 620 where the identified candidate solution(s) are stored. In some embodiments, in response to identifying one or more candidate solutions, a recommended solution or solutions may be provided to an operator of the vehicle without storing the one or more candidate solutions. However, in other embodiments, candidate solution(s) may be determined and stored for each of a plurality of threat modes before selecting a recommended solution and providing the recommended solution to an operator of the vehicle.

If there are no candidate solutions identified in act 618 for the current threat mode, the process proceeds to act 624 where it is determined whether the current threat mode is a final threat mode. For example, in the exemplary threat timeline 500 illustrated in FIG. 5, the "engagement" mode may be considered to be a final threat mode because the threat has engaged the vehicle and the candidate solution(s) may be focused on surviving incoming fire from the threat.

If it is determined in act 624 that the current threat mode is a final threat mode, the process may optionally proceed to act 624 where team-based countermeasures may be deployed, if available. For example, a threat may be associated with an engagement threat mode in which the threat has fired a heat-seeking missile at the vehicle that does not have any countermeasures for stopping the incoming missile. Such a scenario may result in there being no candidate solutions for the vehicle to survive the threat. However, the vehicle may be operating as a part of a coordinated mission with other vehicles that may be able to provide support to the vehicle to mediate the threat.

In the example scenario illustrated in FIG. 1, plane 100 and helicopter 110 are involved in a coordinated mission to destroy target 150. As helicopter 110 approaches target 150, multiple threats including, for example, threat 122 and threat 124 may be actively engaged with helicopter 110 which may not have anti-missile countermeasures on-board. However, plane 100 as a team member of helicopter 110 may have anti-missile countermeasures on-board that can be deployed to neutralize the threat to helicopter 110. When it is determined in act 624 that helicopter 110 is in trouble because there are no candidate solutions, team members capable of assisting helicopter 110 such as plane 100 may be instructed to deploy their countermeasures to increase the survivability chances of helicopter 110.

As discussed above, when one or more candidate solutions are identified in act 618, the identified candidate solution(s) may be stored in act 620 and one or more recommended solutions may be provided to an operator of the vehicle in act 628. In some embodiments, one or more of the identified candidate solutions may be provided to an operator of the vehicle without being stored and embodiments of the invention are not limited in this respect. Furthermore, one or more recommended solutions may be determined from the identified candidate solution(s) in any suitable way and embodiments of the invention are not limited in the particular manner in which recommended solution(s) are determined and provided to the operator. For example, some or all of the identified candidate solution(s) may be analyzed by mission management software executing on one or more processors associated with the vehicle. The mission management software may evaluate the candidate solution(s) against the mission objective(s) and optionally other factors including, for example, whether the vehicle is manned or unmanned and whether the risk of losing the vehicle is outweighed by the importance of completing the mission objective(s). The mission management software may then select one or more of the candidate solutions to provide to the operator as recommended solution(s).

If it is determined in act 624 that the current threat mode is not a final threat mode, the process returns to act 618 where it is determined whether candidate solution(s) exist for breaking the threat timeline of the threat in a next higher-level threat mode or preventing progress of the threat to a more threatening mode higher than the next higher-level threat mode. An example, can be illustrated by referring back to the exemplary threat timeline 500 shown in FIG. 5. As illustrated in FIG. 5, threat 122 was initially associated with the "detection" threat mode and threat timeline parameters were determined beginning with this threat mode. However, it may have been determined in act 618 that no suitable candidate solutions were identified to break the threat timeline or prevent progress of threat 122 to transition into the tracking mode within the TTT1 estimated time constraint. If it was determined that no candidate solutions exist, the process in FIG. 6 proceeds to act 624 where it is determined that the detection mode is not the final mode. The process then returns to act 618 where it is determined if any candidate solution(s) existed to break the threat timeline or prevent progress of threat 122 to transition into the "firing solution" mode within the TTT2 estimated time constraint. The process may continue until one or more candidate solution(s) are identified and/or when it is determined in act 624 that the threat mode currently being considered is a final threat mode, at which point team-based countermeasures may be deployed, if available, to assist the vehicle.

Figure 7:
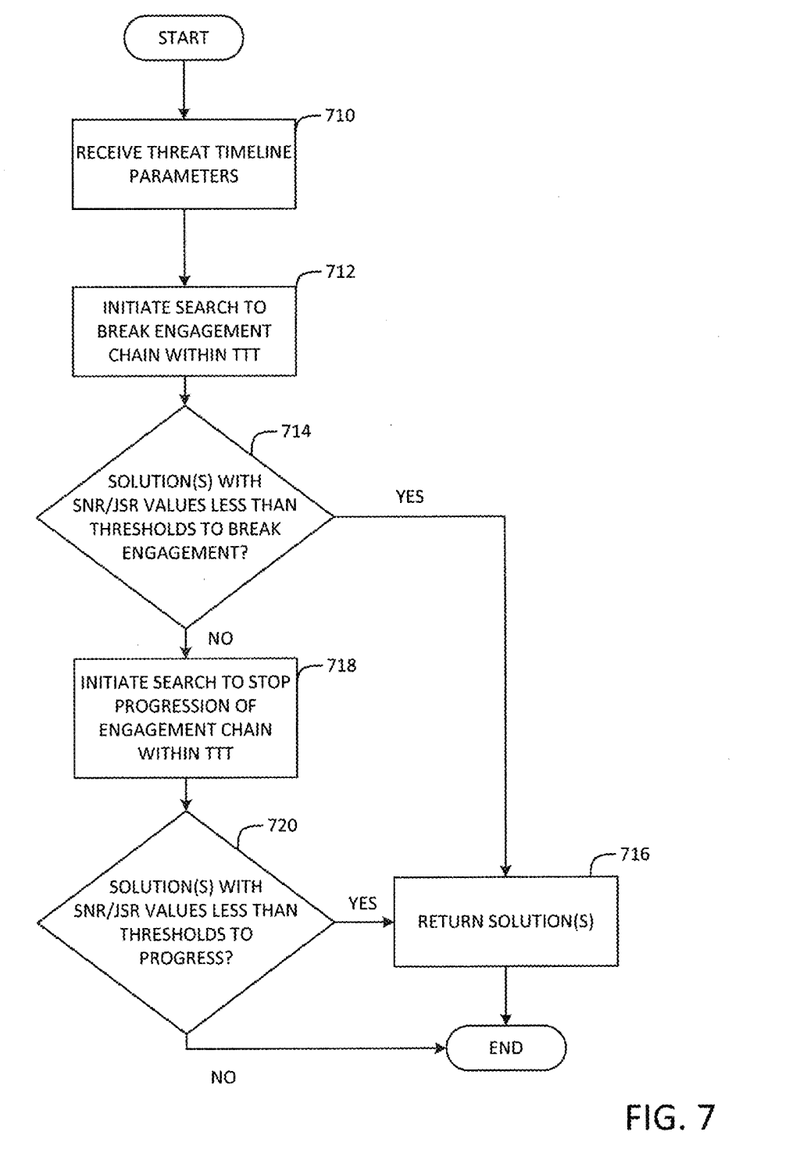
FIG. 7 is a flow chart of a processor for determining one or more candidate solutions to break an threat timeline of a threat or to prevent progress of a threat into another threat mode.

Determining in act 618 whether candidate solution(s) exist may be performed based, at least in part, on one or more threat timeline parameters determined for a particular threat mode. FIG. 7 illustrates an exemplary process for determining whether one or more candidate solution(s) exist based, at least in part, on one or more threat timeline parameters. In act 710, one or more threat timeline parameters are received. As discussed above, the threat timeline parameters for a threat may include, but are not limited to, SNR threshold values and jamming threshold values in one or more threat modes. In some embodiments, these threshold values may be selected based, at least in part, on results of off-line simulation data and the thresholds may be tuned for a particular mission during pre-mission planning and/or during mission execution.

After receiving the threat timeline parameter(s), the process proceeds to act 712 where a search is initiated for one or more candidate solutions that are likely to result in breaking the threat timeline of the threat within an estimated time for the threat to transition to the next threat mode, which is discussed above as the time-to-transition (TTT). The search for candidate solution(s) may be performed in any suitable way and may be informed by the particular threat mode and/or time progression in the threat mode that is determined for a threat. For example, data related to candidate solutions to break the threat timeline for threats in the "detection" mode may be stored in a different manner and/or location that data related to candidate solutions to break the threat timeline for threats in the "engagement" mode. In some embodiments, the identification of a particular threat mode may constrain the search space to only the data related to the identified threat mode thereby increasing the speed at which candidate solution(s) are identified. Constraints other than threat mode are also possible and embodiments of the invention are not limited in this respect. For example, if particular environmental conditions are detected by the vehicle, the search space may be constrained based on these environmental conditions as some candidate solutions may not be well suited to certain environments.

After the search has been initiated, the process proceeds to act 714 where it is determined whether any candidate solution(s) satisfy at least some of the threat timeline parameter(s) related to breaking the threat timeline of the threat. For example, only solutions having SNR or jamming values less than the corresponding threshold values to break engagement within the TTT may be identified as candidate solution(s) to break the engagement. If solution(s) are identified in act 714 that satisfy the threat timeline parameter(s), the solution(s) are returned in act 716. Otherwise, if it is determined in act 714 that no solutions can be identified which satisfy the threat timeline parameter(s), the process proceeds to act 718 were a second search is initiated to determine whether any candidate solution(s) to stop the progression of the threat to the next threat mode can be identified based on threat timeline parameter(s) related to stopping progress.

After the search has been initiated, the process proceeds to act 720 where it is determined whether any solutions exist that satisfy the threat timeline parameter(s) related to stopping the progress of the threat to the next threat mode within the time to transition (TTT) to the next threat mode. For example, in some embodiments, the SNR and/or jamming thresholds for stopping progress to a next threat mode may be different than the thresholds for breaking the threat timeline of the threat thereby leading to different possible candidate solution(s). If candidate solution(s) are identified in act 720, the process proceeds to act 716 where the solution(s) are returned. Otherwise, the process ends and the process of FIG. 6 proceeds from act 618 to act 624 where it is determined if there are more modes or if the mode being currently processed is a final mode. Although the process in FIG. 7 is illustrated as performing separate searches for breaking the threat timeline of the threat and stopping progression to the next threat level, it should be appreciated that any suitable number of searches, including a single search, may be performed to identify candidate solution(s) and embodiments of the invention are not limited in this respect.

Figure 8:
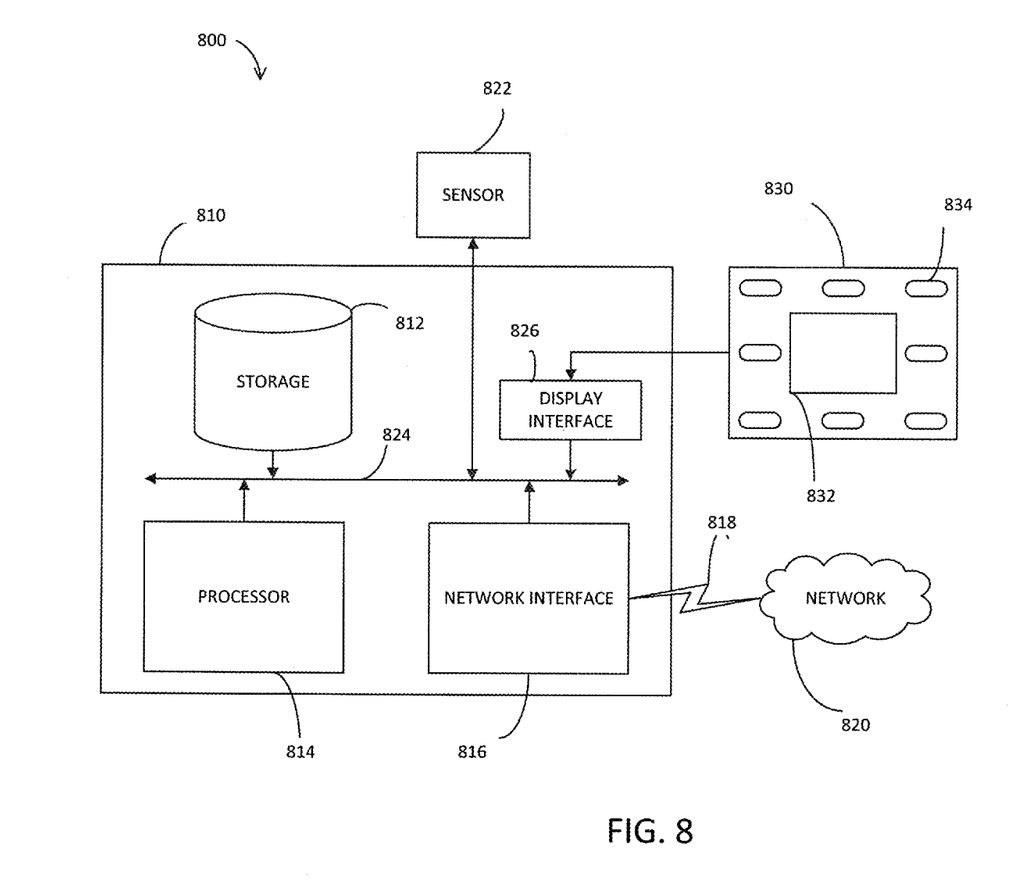
FIG. 8 is an exemplary computer system environment in which some embodiments of the invention may be implemented.

FIG. 8 illustrates an example of a suitable computing system environment 800 on which some embodiments may be implemented. The exemplary computing system environment 800 includes a general purpose computing device in the form of a computer 810. Components of the computer may include, but are not limited to, one or more storage devices 812, a controller 814, such as one or more programmable processors, a network interface 816, a display interface 826, and a system bus 824 that couples various system components to the controller 814. The system bus 824 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The storage device 812 may include volatile and/or non-volatile memory such as read only memory (ROM), random access memory (RAM), or any other type of removable/non-removable, volatile/nonvolatile memory including, but not limited to, magnetic tape cassettes, flash memory card, digital versatile disks, digital video tape, solid state RAM, solid state ROM, and the like. The network interface 816 may be configured to communicate with one or more remote computers via a network 820 using any suitable network communication protocol. For example network interface may comprise a wireless transmitter and a wireless receiver for communicating with a remote computer other other-network connected device via network 820 using wireless communication link 818.

In some embodiments, computing system environment 800 further comprises a display unit 830 connected to the system bus 824 via display interface 826. Display unit 830 may comprise a display 832, such as a liquid crystal display (LCD), and one or more controls 834, which when actuated transmit signals to the computer 810 via the display interface 826. The controls 834 may include pushbuttons, sliders, toggle switches, or any other suitable control. It should be appreciated that although the controls 834 are shown as part of display unit 830, the controls 834 may alternatively be external to the display unit 830 and may be connected to system bus 824 in any suitable manner via any suitable input/output interface.

Computing system environment 800 may further comprise at least one sensor 822 for capturing observational information. Sensor(s) 822 may be connected to the system bus 824 in any suitable manner, including via a networked connection local to a vehicle in which the computer system environment 800 is installed. Sensor(s) 822 may comprise one or more instruments, systems, or subsystems for detecting and recording observational data related to the vehicle. For example, sensor(s) 822 may comprise one or more imaging sensors such as a camera or an infrared sensor, a navigational system such as a global positioning system (GPS), a situational awareness system, or any other suitable type of system for obtaining observational data. It should be appreciated that the computing system environment 800 is not limited to the components illustrated in the exemplary environment 800 and any other additions, deletions, or modifications to the components or combinations of components illustrated in FIG. 8 may also be used.

Having thus described several aspects of some embodiments of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory tangible computer readable storage medium (or multiple computer-readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of assessing threats to a vehicle to facilitate a reflexive response, the method comprising:

determining based, at least in part, on a plurality of information sources, a plurality of threat timeline parameters for a detected threat to the vehicle, wherein the plurality of threat timeline parameters include a first threat mode and a time progression of the threat in the first threat mode;

determining, with at least one processor, one or more candidate solutions based, at least in part, on the first threat mode and the time progression, wherein determining the one or more candidate solutions based, at least in part, on the first threat mode and the time progression comprises limiting a search space for evaluating candidate solutions to include only solutions that may be accomplished within a specific amount of time; and providing at least one of the one or more candidate solutions to an operator of the vehicle to enable the operator to mediate the threat.

2. The method of claim 1, wherein the plurality of information sources comprises stored information about the vehicle.

3. The method of claim 2, wherein the stored information comprises at least one vehicle signature that describes a spatial profile of a particular characteristic as it relates to the vehicle.

4. The method of claim 1, further comprising:
receiving current status information for the vehicle; and
wherein determining the plurality of threat timeline parameters comprises determining the first threat mode and the time progression based, at least in part, on the current status information and at least some historical information related to the current status information.

5. The method of claim 1, wherein determining the plurality of threat timeline parameters comprises:
selecting at least one off-line simulation data parameter based, at least in part, on a current vehicle-to-threat geometry and the first threat mode.

6. The method of claim 1, further comprising:
determining based, at least in part, on the plurality of information sources, a time to transition to a second threat mode; and
determining based, at least in part, on the time to transition to the second threat mode, whether at least one first solution exists to mediate the threat within the first threat mode.

7. The method of claim 6, further comprising:
storing, in response to determining that at least one first solution exists, information related to the at least one first solution.

8. The method of claim 6, wherein determining whether at least one first solution exists comprises:
determining, for one or more possible first solutions, a SNR value and/or a JSR value;
determining for each of the one or more possible first solutions whether the corresponding SNR value and/or the JSR value is less than a first stored SNR threshold value and/or a first stored JSR threshold value; and
determining that at least one first solution exists in response to determining that the SNR value and/or JSR value for at least one of the one or more possible solutions is less than the first stored SNR threshold value and/or the first stored JSR threshold value.

9. The method of claim 6, further comprising:
determining, in response to determining that at least one first solution does not exist, whether at least one second solution exists to prevent progress to the second threat mode.

10. The method of claim 9, wherein determining whether the at least one second solution exists comprises:
determining, for one or more possible second solutions, a SNR value and/or a JSR value;
determining for each of the one or more possible second solutions whether the corresponding SNR value and/or the JSR value is less than a second stored SNR threshold value and/or a second stored JSR threshold value; and
determining that at least one second solution exists in response to determining that the SNR value and/or JSR value for at least one of the one or more possible solutions is less than the second stored SNR threshold value and/or the second stored JSR threshold value.

11. The method of claim 10, further comprising:
storing, in response to determining that at least one second solution exists, information related to the at least one second solution.

12. A non-transitory computer-readable storage medium encoded with a plurality of instructions that when executed by at least one processor perform a method comprising:
determining based, at least in part, on a plurality of information sources, a plurality of threat timeline parameters for a detected threat to a vehicle, wherein the threat timeline parameters include a first threat mode and a time progression of the threat in the first threat mode;
determining one or more candidate solutions based, at least in part, on the first threat mode and the time progression, wherein determining the one or more candidate solutions based, at least in part, on the first threat mode and the time progression comprises limiting a search space for evaluating candidate solutions to include only solutions that may be accomplished within a specific amount of time; and
providing at least one of the one or more candidate solutions to an operator of the vehicle to enable the operator to mediate the threat.

13. The computer-readable storage medium of claim 12, wherein the method further comprises:
receiving current status information for the vehicle; and
wherein determining the threat timeline parameters comprises determining the first threat mode and the time progression based, at least in part, on the current status information and at least some historical information related to the current status information.

14. The computer-readable storage medium of claim 12, wherein determining the threat timeline parameters comprises:
selecting at least one off-line simulation data parameter based, at least in part, on a current vehicle-to-threat geometry and the first threat mode.

15. The computer-readable storage medium of claim 12, wherein the method further comprises:
determining based, at least in part, on the plurality of information sources, a time to transition to a second threat mode; and
determining based, at least in part, on the time to transition to the second threat mode, whether at least one first solution exists to mediate the threat within the first threat mode.

16. A vehicle comprising:
at least one storage device configured to store information regarding at least one signature of the vehicle; and
at least one processor programmed to:
determine based, at least in part, on the stored information, a plurality of threat timeline parameters for a detected threat to the vehicle, wherein the threat timeline parameters include a first threat mode and a time progression of the threat in the first threat mode;
determine one or more candidate solutions based, at least in part, on the first threat mode and the time progression, wherein determining the one or more candidate solutions based, at least in part, on the first threat mode and the time progression comprises limiting a search space for evaluating candidate solutions to include only solutions that may be accomplished within a specific amount of time; and provide at least one of the one or more candidate solutions to an operator of the vehicle to enable the operator to mediate the threat.

17. The vehicle of claim 16, wherein the vehicle is an aircraft.

18. The vehicle of claim 16, wherein the operator of the vehicle is located outside of the vehicle.

19. The vehicle of claim 16, wherein the vehicle is an unmanned vehicle and wherein the at least one processor is programmed to perform at least one action to mediate the threat in response to determining the one or more candidate solutions.

20. The vehicle of claim 19, wherein the at least one processor is programmed to perform the at least one action without receiving an instruction from the operator of the vehicle.

* * * * *